United States Patent
Decker

(10) Patent No.: US 9,192,857 B2
(45) Date of Patent: Nov. 24, 2015

(54) BEAT SYNCHRONIZATION IN A GAME

(71) Applicant: IGT, Las Vegas, NV (US)

(72) Inventor: Duane R. Decker, Reno, NV (US)

(73) Assignee: IGT, Las Vegas, NV (US)

( * ) Notice: Subject to any disclaimer, the term of this patent is extended or adjusted under 35 U.S.C. 154(b) by 111 days.

(21) Appl. No.: 13/948,323

(22) Filed: Jul. 23, 2013

(65) Prior Publication Data

US 2015/0031454 A1    Jan. 29, 2015

(51) Int. Cl.
*G06F 19/00* (2011.01)
*A63F 13/40* (2014.01)
*G07F 17/32* (2006.01)

(52) U.S. Cl.
CPC ............... *A63F 13/10* (2013.01); *G07F 17/32* (2013.01); *A63F 2300/6063* (2013.01)

(58) Field of Classification Search
None
See application file for complete search history.

(56) References Cited

U.S. PATENT DOCUMENTS

| | | | |
|---|---|---|---|
| 3,831,172 A | 8/1974 | Olliges et al. | |
| 4,300,225 A * | 11/1981 | Lambl | 369/2 |
| 4,314,236 A | 2/1982 | Mayer et al. | |
| 4,339,798 A | 7/1982 | Hedges et al. | |
| 4,344,345 A | 8/1982 | Sano | |
| 4,363,482 A | 12/1982 | Goldfarb | |
| RE31,441 E | 11/1983 | Nutting et al. | |
| 4,496,149 A | 1/1985 | Schwartzberg | |
| 4,582,324 A | 4/1986 | Koza et al. | |
| 4,618,150 A | 10/1986 | Kimura | |
| 4,624,459 A | 11/1986 | Kaufman | |
| 4,660,107 A | 4/1987 | Chippendale, Jr. | |
| 4,695,053 A | 9/1987 | Vazquez, Jr. et al. | |
| 4,712,189 A | 12/1987 | Mohri | |
| 4,732,386 A | 3/1988 | Rayfiel | |
| 4,733,593 A | 3/1988 | Rothbart | |
| 4,791,558 A | 12/1988 | Chaitin et al. | |
| 4,876,937 A | 10/1989 | Suzuki | |
| 4,974,483 A | 12/1990 | Luzzatto | |
| 4,974,857 A | 12/1990 | Beall et al. | |
| 5,096,195 A | 3/1992 | Gimmon | |
| 5,119,465 A | 6/1992 | Jack | |
| 5,179,517 A | 1/1993 | Sarbin et al. | |
| 5,221,801 A | 6/1993 | Bruti et al. | |
| 5,223,828 A | 6/1993 | McKiel, Jr. | |
| 5,242,163 A | 9/1993 | Fulton | |
| 5,258,574 A | 11/1993 | Kawano | |

(Continued)

FOREIGN PATENT DOCUMENTS

| GB | 2 201 279 | 8/1988 |
|---|---|---|
| JP | 11197292 | 12/1997 |

(Continued)

OTHER PUBLICATIONS

Wikipedia search result "Beat (music)", url: http://en.wikipedia.org/wiki/Beat_(music), 6 pages.

(Continued)

*Primary Examiner* — Jason Yen

(74) *Attorney, Agent, or Firm* — Neal, Gerber & Eisenberg LLP

(57) ABSTRACT

Systems and methods for synchronizing beats in a game include predicting when beats of the music currently playing in the game will occur. The playing of sound effects, music transitions, or the like that are triggered by in-game events may be synchronized with the predicted beats of the currently playing music.

15 Claims, 4 Drawing Sheets

(56) References Cited

U.S. PATENT DOCUMENTS

| | | |
|---|---|---|
| 5,266,736 A | 11/1993 | Saito |
| 5,275,400 A | 1/1994 | Weingardt et al. |
| 5,287,102 A | 2/1994 | McKiel, Jr. |
| 5,331,112 A | 7/1994 | Sato et al. |
| 5,342,047 A | 8/1994 | Heidel et al. |
| 5,371,345 A | 12/1994 | LeStrange et al. |
| 5,390,938 A | 2/1995 | Takeya |
| 5,393,061 A | 2/1995 | Manship et al. |
| 5,393,070 A | 2/1995 | Best |
| 5,429,507 A | 7/1995 | Kaplan |
| 5,430,835 A | 7/1995 | Williams et al. |
| 5,446,902 A | 8/1995 | Islam |
| 5,449,173 A | 9/1995 | Thomas et al. |
| 5,469,511 A | 11/1995 | Lewis et al. |
| 5,470,233 A | 11/1995 | Fruchterman et al. |
| 5,472,197 A | 12/1995 | Gwiasda et al. |
| 5,508,699 A | 4/1996 | Silverman |
| 5,515,764 A | 5/1996 | Rosen |
| 5,577,253 A | 11/1996 | Blickstein |
| 5,606,144 A | 2/1997 | Dabby |
| 5,625,845 A | 4/1997 | Allran |
| 5,668,996 A | 9/1997 | Radinsky |
| 5,695,188 A | 12/1997 | Ishibashi |
| 5,697,843 A | 12/1997 | Manship et al. |
| 5,703,310 A | 12/1997 | Kurakake et al. |
| 5,707,286 A | 1/1998 | Carlson |
| 5,715,459 A | 2/1998 | Celi |
| 5,745,761 A | 4/1998 | Celi |
| 5,745,762 A | 4/1998 | Celi |
| 5,758,875 A | 6/1998 | Giacalone, Jr. |
| 5,762,552 A | 6/1998 | Vuong et al. |
| 5,766,074 A | 6/1998 | Cannon et al. |
| 5,772,509 A | 6/1998 | Weiss |
| 5,778,231 A | 7/1998 | Van Hoff |
| 5,792,972 A | 8/1998 | Houston |
| 5,802,364 A | 9/1998 | Senator |
| 5,807,172 A | 9/1998 | Piechowiak |
| 5,809,303 A | 9/1998 | Senator |
| 5,833,538 A | 11/1998 | Weiss |
| 5,839,958 A | 11/1998 | Ozarow |
| 5,848,932 A | 12/1998 | Adams |
| 5,854,927 A | 12/1998 | Gelissen |
| 5,876,284 A | 3/1999 | Acres et al. |
| 5,880,386 A | 3/1999 | Wachi et al. |
| 5,889,990 A | 3/1999 | Coleman |
| 5,892,171 A | 4/1999 | Ide |
| 5,902,184 A | 5/1999 | Bennett et al. |
| 5,908,354 A | 6/1999 | Okuniewicz |
| 5,910,048 A | 6/1999 | Feinberg |
| 5,911,071 A | 6/1999 | Jordan |
| 5,920,720 A | 7/1999 | Toutonghi |
| 5,923,878 A | 7/1999 | Marsland |
| 5,923,880 A | 7/1999 | Rose |
| 5,930,509 A | 7/1999 | Yates |
| 5,937,193 A | 8/1999 | Evoy |
| 5,946,487 A | 8/1999 | Dangelo |
| 5,946,489 A | 8/1999 | Yellin |
| 5,964,843 A | 10/1999 | Eisler |
| 5,966,535 A | 10/1999 | Benedikt |
| 5,967,894 A | 10/1999 | Kinoshita et al. |
| 5,970,249 A | 10/1999 | Holze |
| 5,971,271 A | 10/1999 | Wynn et al. |
| 5,978,585 A | 11/1999 | Crelier |
| 5,997,401 A | 12/1999 | Crawford |
| 5,999,731 A | 12/1999 | Yellin |
| 6,003,038 A | 12/1999 | Chen |
| 6,015,346 A | 1/2000 | Bennett |
| D421,277 S | 2/2000 | McGahn et al. |
| 6,021,272 A | 2/2000 | Cahill |
| 6,021,273 A | 2/2000 | Criesemer |
| 6,026,238 A | 2/2000 | Bond |
| 6,029,000 A | 2/2000 | Woolsey |
| 6,031,993 A | 2/2000 | Andrews |
| 6,035,120 A | 3/2000 | Ravichandran |
| 6,056,642 A | 5/2000 | Bennett |
| 6,062,979 A | 5/2000 | Inoue |
| 6,066,181 A | 5/2000 | DeMaster |
| 6,071,192 A | 6/2000 | Weiss |
| 6,074,432 A | 6/2000 | Guccione |
| 6,075,940 A | 6/2000 | Gosling |
| 6,084,169 A | 7/2000 | Hasegawa et al. |
| 6,089,976 A | 7/2000 | Schneider et al. |
| 6,089,978 A | 7/2000 | Adams |
| 6,092,147 A | 7/2000 | Levy |
| 6,096,095 A | 8/2000 | Halstead |
| 6,102,400 A | 8/2000 | Scott et al. |
| 6,106,393 A | 8/2000 | Sunaga et al. |
| 6,110,041 A | 8/2000 | Walker et al. |
| 6,110,043 A | 8/2000 | Olsen |
| 6,110,226 A | 8/2000 | Bothner |
| 6,113,495 A | 9/2000 | Walker et al. |
| 6,117,009 A | 9/2000 | Yoseloff |
| 6,126,165 A | 10/2000 | Sakamoto |
| 6,131,191 A | 10/2000 | Cierniak |
| 6,138,273 A | 10/2000 | Sturges |
| 6,141,794 A | 10/2000 | Dice |
| 6,142,875 A | 11/2000 | Kodachi et al. |
| 6,146,273 A | 11/2000 | Olsen |
| 6,146,276 A | 11/2000 | Okuniewicz |
| 6,155,925 A | 12/2000 | Giobbi et al. |
| 6,159,097 A | 12/2000 | Gura |
| 6,174,233 B1 | 1/2001 | Sunaga et al. |
| 6,174,235 B1 | 1/2001 | Walker et al. |
| 6,175,632 B1 | 1/2001 | Marx |
| 6,198,395 B1 | 3/2001 | Sussman |
| 6,217,448 B1 | 4/2001 | Olsen |
| 6,238,288 B1 | 5/2001 | Walker et al. |
| 6,241,612 B1 | 6/2001 | Heredia |
| 6,254,481 B1 | 7/2001 | Jaffe |
| 6,270,411 B1 | 8/2001 | Gura et al. |
| 6,293,869 B1 | 9/2001 | Kwan et al. |
| 6,302,790 B1 | 10/2001 | Brossard |
| 6,306,034 B1 | 10/2001 | Sakamoto et al. |
| 6,309,299 B1 | 10/2001 | Weiss |
| 6,309,301 B1 | 10/2001 | Sano |
| 6,311,982 B1 | 11/2001 | Lebensfeld et al. |
| 6,328,648 B1 | 12/2001 | Walker et al. |
| 6,390,923 B1 | 5/2002 | Yoshitomi et al. |
| 6,409,596 B1 | 6/2002 | Hayashida et al. |
| 6,416,411 B1 | 7/2002 | Tsukahara |
| 6,516,466 B1 | 2/2003 | Jackson |
| 6,537,152 B2 | 3/2003 | Seelig et al. |
| 6,544,122 B2 | 4/2003 | Araki et al. |
| 6,554,703 B1 | 4/2003 | Bussick et al. |
| 6,561,908 B1* | 5/2003 | Hoke .............................. 463/35 |
| 6,599,195 B1 | 7/2003 | Araki et al. |
| 6,638,169 B2 | 10/2003 | Wilder et al. |
| 2002/0077165 A1 | 6/2002 | Bansemer et al. |
| 2003/0064798 A1 | 4/2003 | Grauzer et al. |
| 2003/0073490 A1 | 4/2003 | Hecht et al. |
| 2003/0227473 A1 | 12/2003 | Shih et al. |
| 2006/0068909 A1 | 3/2006 | Pryzby et al. |
| 2006/0079213 A1* | 4/2006 | Herberger et al. .......... 455/414.1 |
| 2007/0032281 A1* | 2/2007 | Nakatsuka et al. ................ 463/7 |
| 2007/0213134 A1 | 9/2007 | Aida |
| 2010/0273555 A1* | 10/2010 | Beerhorst ........................ 463/35 |
| 2011/0179943 A1* | 7/2011 | Bowen ............................. 84/612 |
| 2012/0214594 A1* | 8/2012 | Kirovski et al. ................ 463/36 |
| 2014/0128160 A1* | 5/2014 | Gillet et al. ..................... 463/35 |

FOREIGN PATENT DOCUMENTS

| | | |
|---|---|---|
| JP | 11216221 | 8/1999 |
| JP | 02000296209 | 10/2000 |

OTHER PUBLICATIONS

Article, "A Salute to Game Shows—The Price is Right—Pricing Games—Three Strikes," p. 8 of 9, online, retrieved on Aug. 16, 2000. Retrieved from the Internet: <<http://ben-schumin.simplenet.com/game-shows/shows/price-is-right/pricing-games-4.htm>.

Article, "Frankie & Annette's Beach Party Bally Gaming," published by Strictly Slots, Dec. 2001.

(56) References Cited

OTHER PUBLICATIONS

Article, "Megaman X's Soundcard History Museum," online pp. 1-5, retrieved on May 11, 2000 retrieved on Internet at <http://digitalparadise.cgocable.ca/MegaMan_X/Soundcards>.
Article, "Microprocessor Report," pp. 2, 12-17, published by Micro Design Resources on Mar. 25, 1996.
Article, "Monopoly Movers & Shakers Williams/WMS Gaming," published by Strictly Slots publication in Jul. 2000.
Brochure of Bally Gaming, Inc., "EVO Hybrid Frankie & Annette's Beach Party," published by Bally Gaming, Inc. In the year 2001 on or before December thereof.
Brochure of Bally Gaming, Inc., "Frankie & Annette's Beach Party (EVO Hybrid),"http://www.ballygaming.com/gameroom/games.asp?gameID=664>, Jan. 9, 2004.
Brochure of IGT, "Elephant King," http://www.igt.com/games/new_games/elephant.html, Mar. 21, 2001.
Brochure of IGT, "Leopard Spots, Double Diamond 2000, Little Green Men, Elephant King, I Dream of Jeannie," available in Oct. 1999.
Brochure of IGT, "Run for Your Money S-Plus Limited," published in the year 1998 on or before December thereof.
Brochure of IGT, "Top Dollar S-Plus Limited," published in the year 1998 on or before December thereof.
Brochure of IGT, "Totem Pole," written by IGT, available in the year 1997, on or before December thereof.
Brochure of IGT, "Wheel of Fortune," published in the year 1998 on or before December thereof.
Brochure of WMS Gaming Inc., "Meet the Next Generation of Monopoly Slot Machines from WMS Gaming!" published by Hasbro, Inc. in the year 1999 on or before December thereof.
Brochure of WMS Gaming Inc., "Monopoly Chairman of the Board," published by Hasbro, Inc. in the year 1999 on or before December thereof.
Brochure of WMS Gaming Inc., "Monopoly Once Around," published by Hasbro, Inc. in the year 1998 on or before December thereof.
Brochure of WMS Gaming Inc., "Monopoly Reel Estate," published by Hasbro, Inc. in the year 1998 on or before December thereof.
Brochure of WMS Gaming Inc., "Movers & Shakers," published by Hasbro, Inc. in the year 2000 on or before December thereof.
Chutes and Ladders CD-ROM Game, Hasbro Interactive, Inc., available in the year 1999 on or before December thereof.
Description of Accelerated Credit Roll-Up in Gaming Machines written by IGT, available in the year 1999 on or before December thereof.
Description of Action Prompts in Gaming Machines, written by IGT, available in the year 1999 on or before December thereof.
Description of Last Sound in Credit Roll-Up in Gaming Machines written by IGT, available in the year 2000 on or before December thereof.
Description of Lighting Features in Gaming Machines, written by IGT, available in the year 1999 on or before December thereof.
Description of Maximum Wager Sound and Bet Sounds in Gaming Devices written by IGT, available in the year 2000 on or before December thereof.
Description of Payout Sound Feature in Gaming Machine written by IGT, available in the year 1999 on or before December thereof.
Description of Progressive Sound Feature in Pinball and Video Games written by IGT, available in the year 1999 on or before December thereof.
Description of Sound Effects in Gaming Devices written by IGT, available in the year 2000 on or before December thereof.
Description of Sound Feature in Totem Pole™ Gaming Machine written by IGT, available in the year 1997 on or before December thereof.
Description of Tempo Change in Gaming Machines written by IGT, available in the year 2000 on or before December thereof.
Description of Verbal Wager Feature in "Dick Clark" Gaming Machine written by IGT, available in the year 2000 on or before December thereof.
Description of Volume Control Functions in Gaming Machines written by IGT, available in the year 1999 on or before December thereof.
MIDI Media Adaptation Layer for IEEE-1394, published by the Association of Musical Electronics Industry in Tokyo, Japan and The MIDI Manufacturers Association in Los Angeles, California, Nov. 30, 2000, pp. 1-17.
Press Release by Ian Fried of CNET News.com, "Microsoft Releases XP for Slot Machines," file://C:Window . . . /Microsoft releases XP for slot machines—Tech News—CNET.com.htm, Nov. 28, 2001, pp. 1-2.
Press Release, "WMS Gaming's Monopoly Slot Machines Named 1998's Most Innovative Gaming Product at the American Gaming, Lodging and Leisure Summit," published by WMS Gaming Inc. on Jan. 13, 1999.
Screen Shot and Description by IGT of "Free Spins Bonus (Elephant King)" written by IGT, available in Oct. 1999.
Screen Shots of "Race Car Bonus Feature" written by IGT, available in the year 1998 on or before December thereof.
The Java™ Tutorial, "What Can Java Technology Do?" [online] pp. 1-2 [retrieved on Oct. 16, 2000]. Retrieved from the Internet URL:http://java.sun.com/docs/books/tutorial/getStarted/i.../definition.htm.
The MIDI File Format, http://crystal.capana.org.au/ghansper/midi_introduction/midi_file_format.html, Dec. 28, 2001, pp. 1-10.

* cited by examiner

BEAT SYNCHRONIZATION IN A GAME

BACKGROUND

1. Field of the Described Embodiments

The present disclosure relates generally to sound management in an electronic game. The present disclosure particularly relates to synchronizing the switching of music tracks or the playing of in-game sound effects based on the beats of a currently playing track.

2. Description of the Related Art

Many of today's gaming casinos and other entertainment locations feature different single and multi-player gaming systems such as slot machines and video poker machines. The gaming machines may include a number of hardware and software components to provide a wide variety of game types and game playing capabilities. Exemplary hardware components may include bill validators, coin acceptors, card readers, keypads, buttons, levers, touch screens, coin hoppers, ticket printers, player tracking units and the like. Software components may include, for example, boot and initialization routines, various game play programs and subroutines, credit and payout routines, image and audio generation programs, various component modules and a random or pseudo-random number generator, among others.

Gaming machines are highly regulated to ensure fairness. In many cases, gaming machines may be operable to dispense monetary awards of a large amount of money. Accordingly, access to gaming machines is often carefully controlled. For example, in some jurisdictions, routine maintenance requires that extra personnel (e.g., gaming control personnel) be notified in advance and be in attendance during such maintenance. Additionally, gaming machines may have hardware and software architectures that differ significantly from those of general-purpose computers (PCs), even though both gaming machines and PCs employ microprocessors to control a variety of devices. For example, gaming machines may have more stringent security requirements and fault tolerance requirements. Additionally, gaming machines generally operate in harsher environments as compared with PCs.

Video games, such as wager-based games played on gaming machines, may have any number of sound effects and music tracks that are played during gameplay. For example, a base game may have a first track of background music and a bonus round may have a different track of background music. In another example, a sound effect may be played in response to a certain in-game event occurring (e.g., the player is dealt blackjack in the game, the player hits a jackpot in the game, etc.).

SUMMARY

According to one embodiment, a method of synchronizing beats in a game is disclosed. The method includes initiating, by a processing circuit, the playing of an audio file in the game and predicting, by the processing circuit, when beats of the playing audio file will occur. The method also includes identifying an occurrence of an in-game event and identifying an audio file associated with the in-game event. The method further includes synchronizing the playing of the audio file associated with the in-game event with the predicted beats of the playing audio file.

According to another embodiment, a system for synchronizing beats in a game is disclosed. The system includes a processing circuit configured to initiate the playing of an audio file in the game and to predict when beats of the playing audio file will occur. The processing circuit is also configured to identify an occurrence of an in-game event and to identify an audio file associated with the in-game event. The processing circuit is additionally configured to synchronize the playing of the audio file associated with the in-game event with the predicted beats of the playing audio file.

According to a further embodiment, a computer-readable storage medium having instructions is disclosed. Stored in the medium are instructions that, when executed by one or more processors, cause the one or more processors to perform operations. The operations include initiating the playing of an audio file in the game and predicting when beats of the playing audio file will occur. The operations also include identifying an occurrence of an in-game event and identifying an audio file associated with the in-game event. The operations further include synchronizing the playing of the audio file associated with the in-game event with the predicted beats of the playing audio file.

In yet another embodiment, an electronic gaming machine is disclosed. The gaming machine is configured to synchronize beats in a wager-based game. The gaming machine includes one or more electronic displays configured to display the wager-based game. The gaming machine also includes one or more speakers configured to play audio of the game. The gaming machine further includes a processing circuit configured to execute the wager-based game and to initiate the playing of an audio file in the game. The processing circuit is also configured to predict when beats of the playing audio file will occur, to identify an occurrence of an in-game event, and to identify an audio file associated with the in-game event. The processing circuit is further configured to synchronize the playing of the audio file associated with the in-game event with the predicted beats of the playing audio file.

BRIEF DESCRIPTION OF THE DRAWINGS

The details of one or more implementations are set forth in the accompanying drawings and the description below. Other features, aspects, and advantages of the disclosure will become apparent from the descriptions, the drawings, and the claims, in which:

DETAILED DESCRIPTION

Numerous specific details may be set forth below to provide a thorough understanding of concepts underlying the described embodiments. It may be apparent, however, to one skilled in the art that the described embodiments may be practiced without some or all of these specific details. In other instances, some process steps have not been described in detail in order to avoid unnecessarily obscuring the underlying concept.

According to various embodiments described herein, the playing of sound effects or music transitions in an electronic game may be synchronized to the beats of the currently playing track of music. In some embodiments, the beats of the current background music of a game may be detected. In response to detecting an in-game event that triggers a change in the background music of the game and/or the playing of a sound effect, the playing of the new music or sound effect may be coordinated with the beats of the current background music. For example, the playing of the sound effect or new music may be delayed until a time that corresponds to the next beat of the background music or any subsequent beat.

Figure 1:
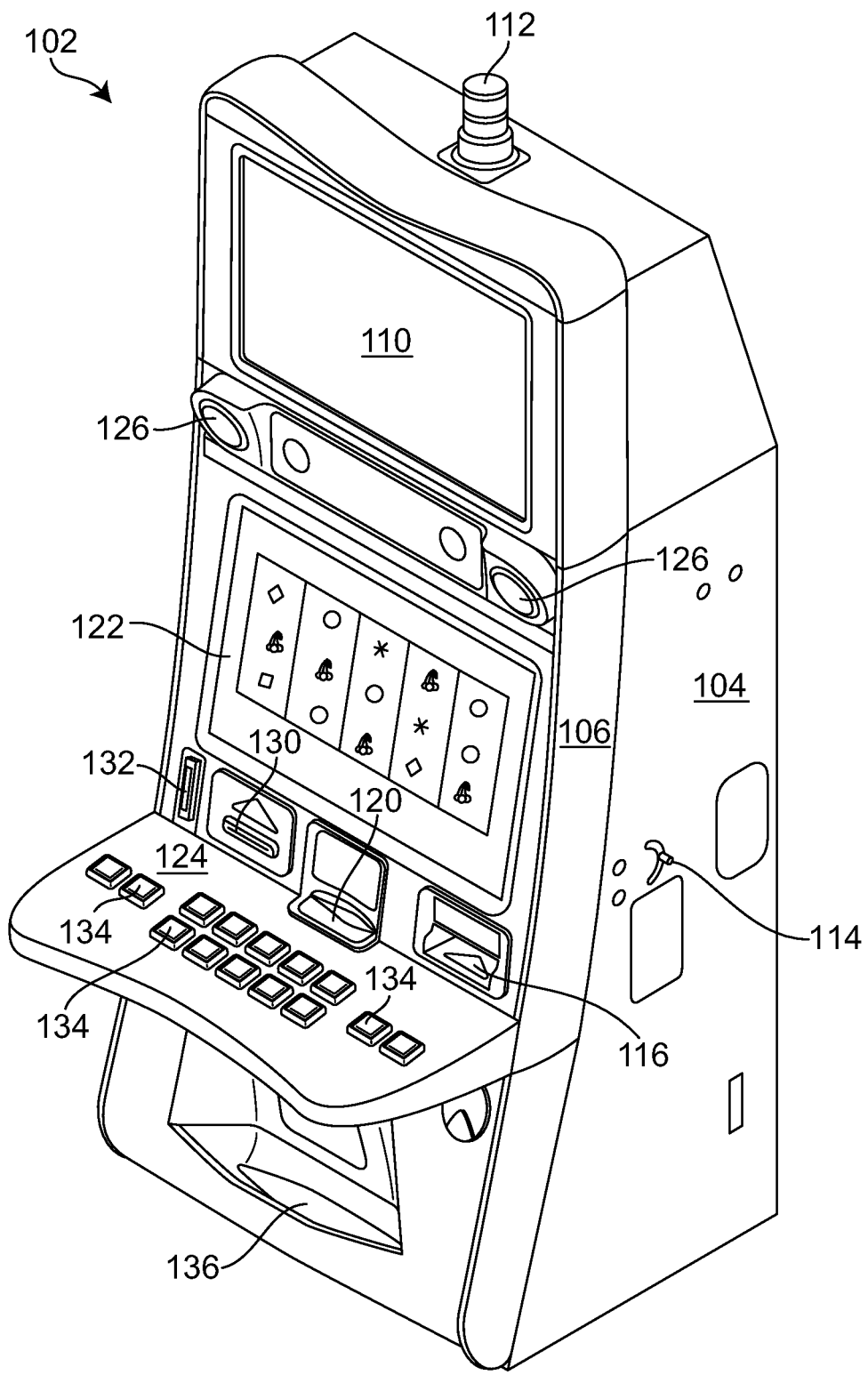
FIG. 1 is an illustration of a gaming machine, according to an exemplary embodiment.

Referring to FIG. 1, a perspective drawing of an electronic gaming machine 102 is shown in accordance with described embodiments. Gaming machine 102 may include a main cabinet 104. Main cabinet 104 may provide a secure enclosure that prevents tampering with device components, such as a game controller (not shown) located within the interior of main cabinet 104. Main cabinet 104 may include an access mechanism, such as a door 106, which allows the interior of gaming machine 102 to be accessed. Actuation of a door 106 may be controlled by a locking mechanism 114. In some embodiments, locking mechanism 114, door 106, and the interior of main cabinet 104 may be monitored with security sensors of various types to detect whether the interior has been accessed. For instance, a light sensor may be provided within main cabinet 104 to detect a change in light-levels when door 106 is opened and/or an accelerometer may be attached to door 106 to detect when door 106 is opened.

Gaming machine 102 may include any number of user interface devices that convey sensory information to a user and/or receive input from the user. For example, gaming machine 102 may include electronic displays 110, 122, speakers 126, and/or a candle device 112 to convey information to the user of gaming machine 102. Gaming machine 102 may also include a console 124 having one or more inputs 134 (e.g., buttons, track pads, etc.) configured to receive input from a user. In one embodiment, display 110 and/or display 122 may also be a touch screen display configured to receive input from a user. A controller (not shown) within gaming machine 102 may run a game, such as a wager-based game, in response to receiving input from a user via inputs 134, display 122, or display 110. For example, inputs 134 may be operated to place a wager in the game and to run the game. In response, the controller may cause reels shown on display 122 to spin, such as with a software-implemented slot game. In other embodiments, gaming machine 102 may include electro-mechanical reels or similar devices in addition to, or in lieu of, electronic displays. For example, display 122 alternatively may be electro-mechanical reels configured to spin as part of a slot-based game.

Gaming machine 102 may also include devices for conducting a wager-based game. For example, gaming machine 102 may include an acceptor 116 and a printer 120. In various embodiments, gaming machine 102 may be configured to run on credits that may be redeemed for money and/or other forms of prizes. Acceptor 116 may read an inserted ticket having one or more credits usable to play a game on gaming machine 102. For example, a player of gaming machine 102 may wager one or more credits within a video slot game. If the player loses, the wagered amount may be deducted from the player's remaining balance on gaming machine 102. However, if the player wins, the player's balance may be increased by the amount won. Any remaining credit balance on gaming machine 102 may be converted into a ticket via printer 120. For example, a player of gaming machine 102 may cash out of the machine by selecting to print a ticket via printer 120. The ticket may then be used to play other gaming machines or redeemed for cash and/or prizes. According to various embodiments, gaming machine 102 may record data regarding its receipt and/or disbursement of credits. For example, gaming machine 102 may generate accounting data whenever a result of a wager-based game is determined. In some embodiments, gaming machine 102 may provide accounting data to a remote data collection device, allowing the remote monitoring of gaming machine 102.

In some cases, gaming machine 102 may be configured to receive and/or dispense physical money or tokens used by the gaming establishment. For example, gaming machine 102 may include an acceptor 132 configured to receive coins or tokens. Similarly, gaming machine 102 may include a bill acceptor. For example, acceptor 116 may be configured to accept bills in addition to, or in lieu of, tickets. Money or tokens received by gaming machine 102 may be converted into game credits. In some embodiments, gaming machine 102 may be configured to dispense money or tokens via a coin hopper 136. For example, a player may cash out of gaming machine 102 by converting any remaining game credits into money or tokens dispensed via coin hopper 136. In some cases, a threshold amount may be used by gaming machine 102 to control whether a redeemable ticket is printed by printer 120 or a payout is paid via coin hopper 136 (e.g., small payouts below a threshold dollar amount may be paid via coin hopper 136 while larger payouts are paid via a printed ticket).

In one embodiment, gaming machine 102 may include a loyalty card acceptor 130. In general, a loyalty card may be tied to a user's loyalty account. A loyalty account may store various information about the user, such as the user's identity, the user's gaming preferences, the user's gaming habits (e.g., which games the user plays, how long the user plays, etc.), or similar information about the user. A loyalty account may also be used to reward a user for playing gaming machine 102. For example, a user having a loyalty account may be given a bonus turn on gaming machine 102 or credited loyalty points for playing gaming machine 102. Such loyalty points may be exchanged for loyalty rewards (e.g., a free meal, a free hotel stay, free room upgrade, discounts, etc.).

Figure 2A:
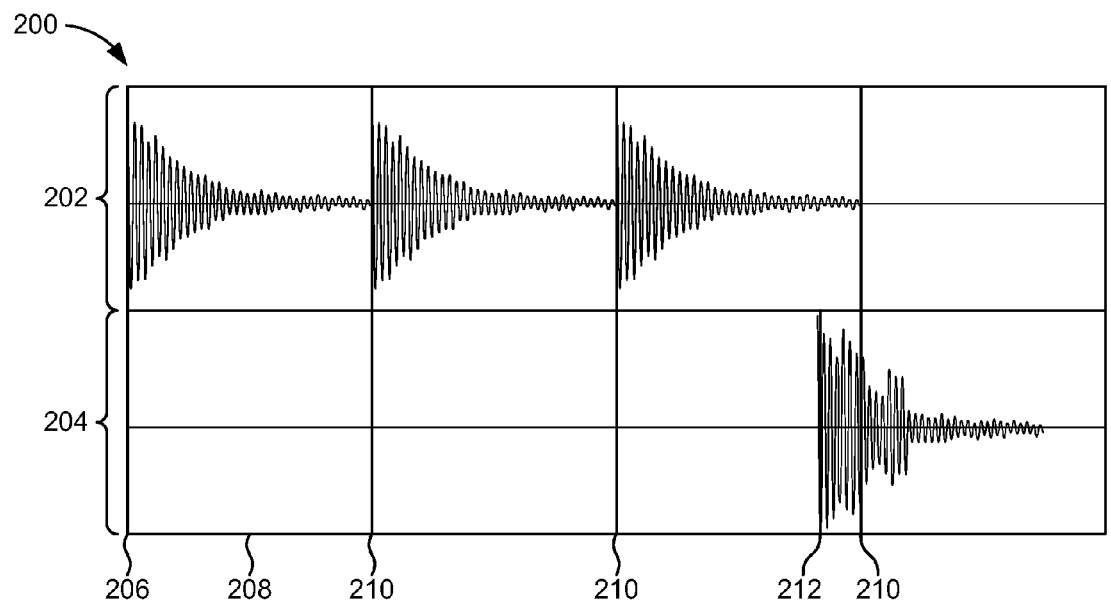
FIG. 2A is an illustration of an unsynchronized music transition in a game due to an in-game event, according to an exemplary embodiment.

Referring now to FIG. 2A, an illustration 200 is shown of an unsynchronized music transition in a game due to an in-game event, according to an exemplary embodiment. In the example shown, different songs 202, 204 are graphed using an axis 206 (e.g., a measurement of the song) versus a time axis 208. At peak measurements along axis 206 are the beats of songs 202, 204. In general, a beat refers to the rhythm, tempo, cadence, etc. of a song or other sound effect.

In one embodiment, songs 202, 204 are different background songs that are played in the corresponding game. For example, song 202 may be the base song for a wager-based game and song 204 may be a song for a bonus round or when the game is waiting for an interaction with the player. In further embodiments, songs 202, 204 may be any form of sound effect or other music file associated with the game. For example, song 204 may instead be a sound effect that plays whenever a player hits the jackpot in a slot-based game. In the example shown, song 202 has beats occurring periodically at times 210 along time axis 208. At a point in time 212, an in-game event occurs that triggers the playing of song 204. For example, the game may switch from playing song 202 to playing song 204, in response to the game entering a bonus round at time 212. In one embodiment, song 202 may continue to play while another sound is played at time 212 (e.g., a sound effect or the like).

In the non-synchronized case of FIG. 2A, the game may immediately begin playing song 204 at time 212 in response to an in-game event occurring. However, the beats of song 202 occur at periodic times 210 meaning that the game has switched songs in the middle of the beats of 202, thereby breaking the beat. For players of video games, such as wager-based games, this may break a player's concentration enough to cause the player to stop playing the game.

Figure 2B:
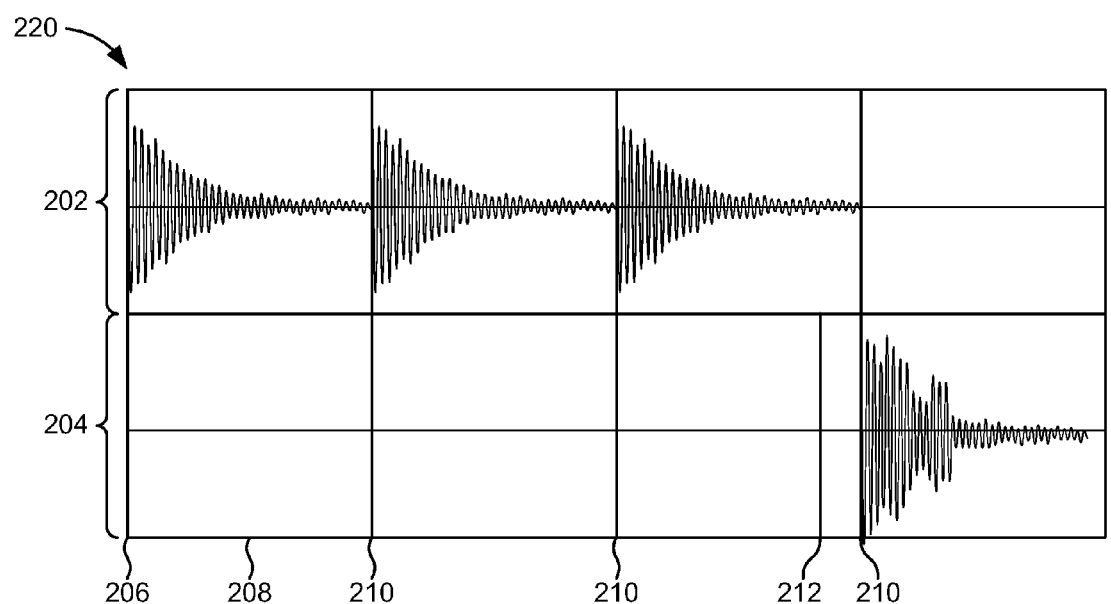
FIG. 2B is an illustration of the music transition of FIG. 2A synchronized to the beats of the background music of the game, according to an exemplary embodiment.

Referring now to FIG. 2B, an illustration 220 is shown of a synchronized music transition in a game due to an in-game event, according to an exemplary embodiment. As shown in illustration 220, assume that song 202 is the same song as in FIG. 2A and has the same beats occurring at periodic intervals 210. Also, assume that an in-game event triggering the playing of song 204 or another sound file (e.g., a sound effect, etc.) occurs at time 212. In various embodiments, the gaming system may be configured to synchronize the playing of song 204 or another sound file with the beats of song 202.

In the synchronized case of FIG. 2B, the gaming system may delay the playing of song 202, sound effect, or the like until the next beat of song 202 or a subsequent beat thereafter. In other words, the system may delay the playing of song 204 until one of times 210 occurs. In some embodiments, the gaming system may analyze song 202 to determine when a subsequent time 210 will occur. For example, the gaming system may begin a timer when song 202 begins playing, determine when the next beat or beats will occur, and time the transition to song 204 accordingly. Thus, the beginning of song 204 will continue in step with the playing of song 202, thereby synchronizing the start of song 204 with the beat of song 202.

For example, assume that song 202 has a BPM value of 120 and that a software or hardware timer starts a count when song 202 begins (e.g., the timer references a clock, retrieves the time, and saves it). In other words, the first beat of song 202, as determined by the timer, may begin at a reference time of 0.00 seconds. Assume also that an in-game event occurs, triggering a request that song 204 be played at the reference time 55.022 (e.g., at time 212). A beat detector may analyze song 202 with respect to its BPM value of 120 and the start reference time of 0.00 seconds to determine that the beats of song 202 will occur every 0.5 seconds. Based on this determination, the next predicted beat for song 202 is at 55.50 seconds. The beat predictor may then calculate a delay to offset the playing of song 204 from the triggering event identified at time 212. For example, a delay of 0.478 seconds may be determined (e.g., the difference between the next predicted beat at 55.50 seconds and the trigger request at reference time 55.022) to delay the start of song 204. Thus, the playing of song 204 may be synchronized to the beats of song 202.

Figure 3:
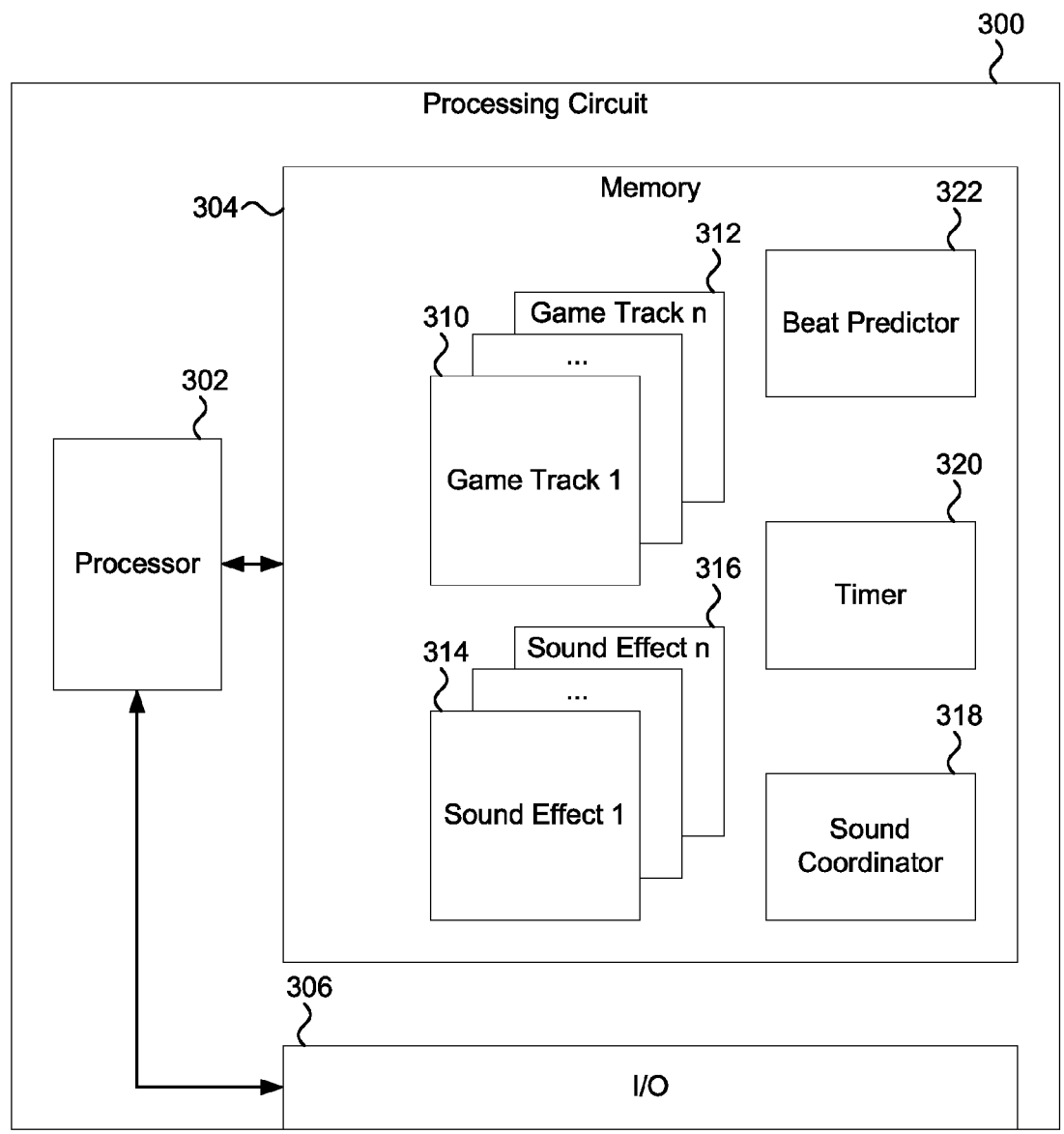
FIG. 3 is a block diagram of a processing circuit configured to synchronize beats in a game, according to an exemplary embodiment.

Referring now to FIG. 3, a block diagram is shown of a processing circuit 300 configured to synchronize beats in a game, according to various embodiments. Processing circuit 300 may be configured to control the audio for a gaming machine, a bank of gaming machines, a portable device, a console gaming system, or any other device on which an electronic game may be played. In some embodiments, processing circuit 300 may be a separate computing device from a controlled gaming machine or other device on which a game may be played. In other embodiments, processing circuit 300 may be physically part of the device or implemented in part or in whole as software.

Processing circuit 300 may include a processor 302 and a memory 304. Memory 304 stores machine instructions that, when executed by processor 302, cause processor 302 to perform one or more operations described herein. Processor 302 may include a microprocessor, FPGA, ASIC, any other form of processing electronics, or combinations thereof. Memory 304 may be any electronic storage medium such as, but not limited to, a floppy disk, a hard drive, a CD-ROM, a DVD-ROM, a magnetic disk, RAM, ROM, EEPROM, EPROM, flash memory, a solid state drive, optical memory, or combinations thereof. Memory 304 may be a tangible storage medium that stores non-transitory machine instructions. Processing circuit 300 may include any number of processors and memories. In other words, processor 302 may represent the collective processing devices of processing circuit 300 and memory 304 may represent the collective storage devices of processing circuit 300. Processor 302 and memory 304 may be on the same printed circuit board or may be in communication with each other via a bus or other form of connection.

Processing circuit 300 may include input and output (I/O) hardware 306 in communication with processor 302. I/O hardware 306 includes the interface hardware used by processing circuit 300 to receive data from other devices and/or to provide data to other devices. For example, a command may be sent from processing circuit 300 to gaming machine 102 via I/O hardware 306. I/O hardware 306 may include, but is not limited to, hardware to communicate on a local system bus and/or on a network. For example, I/O hardware 306 may include a port to transmit audio data to a gaming device and another port to receive data from a network. In some embodiments, I/O hardware 306 may be directly hardwired to a speaker of a gaming machine or other device. For example, speakers 126 of gaming machine 102 shown in FIG. 1 may receive audio data from processing circuit 300 during gameplay.

Memory 304 may include any number of game tracks 310-312 for a game (e.g., a first through nth audio file containing music or other audio tracks for a game). Game tracks 310-312 may include, in some cases, songs that are played during gameplay. In some embodiments, game tracks 310-312 may correspond to different states of play for the game. For example, game tracks 310-312 may include tracks for various states of the game, such as a normal round, a bonus round, a waiting state, or the like. Game tracks 310-312 may also include audio tracks for a group play mode, where players of a bank of gaming machines collaborate in-game. In some cases, game tracks 310-312 may include audio files specific to each gaming machine or a speaker of each gaming machine. For example, game tracks 310-312 may include audio tracks for different game states to be played by different speakers in the bank of gaming machines. In other embodiments, game tracks 310-312 may be stored separately from processing circuit 300, such as in a separate memory of a gaming machine.

Game tracks 310-312 may include audio tracks for multiple games. For example, game tracks 310-312 may include audio tracks for a video poker game and a video slot game playable by a gaming machine or other device. Thus, the game available to a player may be changed (e.g., in response to a selection by the user, a command from the proprietor of a gaming establishment, etc). For example, a casino operator may select which games are available for play at a gaming machine.

Memory 304 may include any number of game sound effects 314-316 (e.g., a first through nth audio file containing sound effect for a game or set of games). In contrast to game tracks 310-312, sound effects 314-316 may only be played at certain points in time during game play. For example, sound effect 314 may be an alert that is played when a player hits a jackpot. Sound effects 314-316 may be played concurrently with game tracks 310-312 or may interrupt the play of an audio track, in various embodiments. For example, an audio track for a bonus round may be played at the same time as a jackpot sound effect. Similar to game tracks 310-312, game sound effects 314-316 may also be stored in a separate memory from processing circuit 300, according to some embodiments. In such cases, processing circuit 300 may provide control signals to a running game to control which audio tracks or sound effects are played.

Memory 304 may include a timer 320 configured to operate as a master timer for game tracks 310-312 and/or sound effects 314-316. In other words, timer 320 may provide a common time reference count for the different audio files played in the game. Timer 320 may maintain a count based on a hardware-based oscillator in processor 302. For example, an oscillator crystal in processor 302 may oscillate at a particular frequency. Based on the frequency of the oscillations, timer 320 may update the playback count for game tracks 310-312. For example, a timer may be used to determine that one of game tracks 310-312 has been playing by a gaming machine for exactly 25.4 seconds.

In some embodiments, memory 304 may include a beat predictor 322 configured to determine when the beats of game tracks 310-312 and/or sound effects 314-316 will be played. In one embodiment, game tracks 310-312 and/or sound effects 314-316 include information regarding their respective beats. For example, each sound file may include a beats per minute (BPM) data value or any other data value indicating the frequency of the beats. Beat predictor 322 may use timer 320 to begin timing from when a sound file is played and use the BPM or other value in the sound file to determine when the beats of the file will occur. For example, assume that game track 310 has a BPM value of 120 BPM. Thus, there is one beat every half second when game track 310 is played. When game track 310 begins playing, beat predictor 322 uses timer 320 to begin timing the song. Based on the clock of timer 320, beat predictor 322 may determine that future beats will occur at 0.5 seconds, 1 second, 1.5 seconds, etc. into the song.

In further embodiments, beat predictor 322 may analyze a song while it is playing to determine when the beats of the song occur. For example, beat predictor 322 may analyze the audio output of game track 310 to determine when the beats of the song occur and predict when future beats are likely to occur. For example, beat predictor 322 may, in real time, analyze the audio being provided to a speaker to determine when the beats of the song occur.

Memory 304 may include a sound coordinator 318, according to various embodiments. Sound coordinator 318 is configured to identify the occurrence of an in-game event that triggers the playing of an audio track and to synchronize the playing of the triggered audio with the currently playing audio. Identification may be based on receiving an indication indicating that the in-game event has occurred or will occur. Sound coordinator 318 may play the audio associated with the in-game event on the next beat or on a subsequent beat of the currently playing audio. In some cases, sound coordinator 318 may coordinate the transition between the currently playing audio and the audio triggered by the in-game event. For example, sound coordinator 318 may stop playing a background song in game tracks 310-312 at the same time that a new one of game tracks 310-312 begins playing on the next beat of the background song predicted by beat predictor 322 (e.g., a bonus round of the game is triggered). In the case of a song transition, beat predictor 322 may reset the count for the new song and begin predicting the beats of the new song. In further cases, sound coordinator 318 may continue playing the currently playing audio from game tracks 310-312 and coordinate the playing of one of sound effects 314-316 with the next beat of the currently playing audio predicted by beat predictor 322. For example, sound coordinator 322 may delay the playing of a sound effect triggered by an in-game jackpot until the next predicted beat of the background audio. In the case of a sound effect being played in conjunction with a game track (e.g., a game credit rollup or other sound effect), beat predictor 322 may continue using the same count for the game track, since the game track continues to play during the sound effect.

In one example of operation, assume that game track 310 has a BPM value of 120 and that an in-game event occurs 55.022 seconds into the song that triggers the playing of another audio file (e.g., one of game tracks 310-312 or sound effects 314-316). Since the next beat predicted by beat predictor 322 for game track 310 is at 55.50 seconds, sound coordinator 318 may delay the playing of the other audio file until the 55.50 mark in the playing of game track 310. In other words, sound coordinator 318 may delay the playing of the new audio file for 0.478 seconds from the occurrence of the in-game event. In some cases, the delay by sound coordinator 318 may also take into account signal latencies, such as the time needed for the sound to actually be played by a speaker.

In some embodiments, sound coordinator 318 may be configured to coordinate the playing of new game tracks and/or sound effects in the game with audio from outside of the game itself. For example, processing circuit 300 may receive ambient noise from a microphone via I/O hardware 306 (e.g., a gaming machine may be equipped with a microphone). In response, beat predictor 322 may determine whether any beats of the ambient noise can be detected and predict future beats. Sound coordinator 318 may synchronize the playing of a game track or sound effect with the beats of the ambient noise, if any exist. For example, processing circuit 300 may synchronize the playing of sound effects 314-316 with the beats of songs played by nearby gaming machines. In a further embodiment, processing circuit 300 may receive audio information directly from one or more other gaming machines. For example, a nearby gaming machine may provide information to processing circuit 300 regarding the currently playing game track (e.g., when the track started, the BPM of the track, etc.), the occurrence of any in-game events, or other such information. In yet another embodiment, processing circuit 300 may be configured to control the playing of audio by multiple gaming machines, such as a bank of gaming machines.

In yet another embodiment, sound coordinator 318 may be configured to coordinate the playing of game tracks 310-312 and/or sound effects 314-316 with the beats of an audio file being played by a portable electronic device. For example, processing circuit 300 may establish a wireless communications link with a player's smartphone or other portable electronic device or which beat information may be conveyed. In such a case, processing circuit 300 may receive data from the portable electronic device regarding the currently playing audio (e.g., BPM, when the audio started, etc.). In response, sound coordinator 318 may coordinate the transition between game tracks and/or the playing of sound effects with the beats of the audio being played on the portable electronic device. In some cases, processing circuit 300 may provide the game track or sound effect directly to the portable device over the wireless link. For example, assume that a player of a gaming machine is also listening to a song on his or her portable device while playing the gaming machine. If so, processing circuit 300 may coordinate the game tracks or sound effects of the game with the song being played on the player's portable device. In some cases, processing circuit 300 may even provide the sound effect to the portable device for play. For example, the player may hear the jackpot sound effect on his or her headphones.

Figure 4:
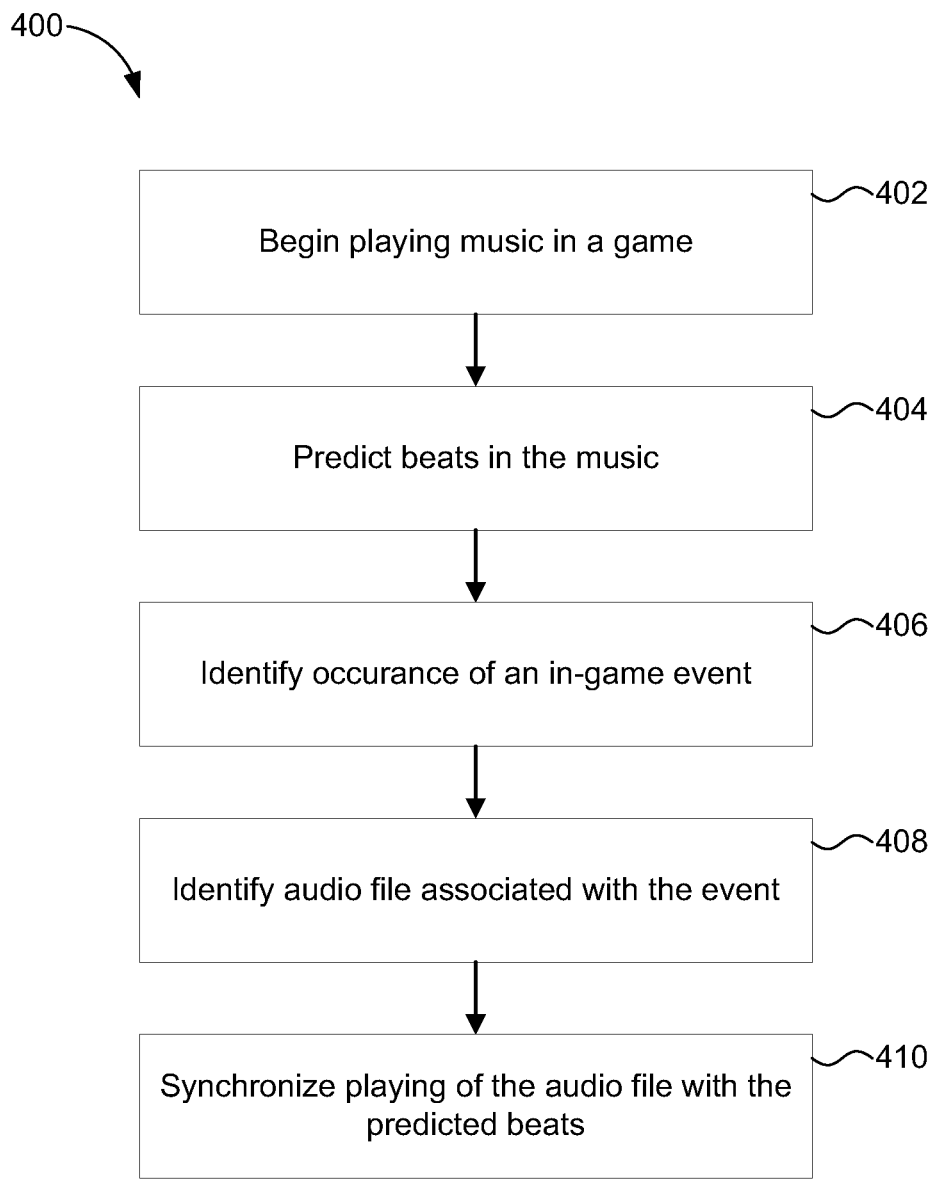
FIG. 4 is a flow diagram of a process for synchronizing beats in a game, according to an exemplary embodiment.

Referring now to FIG. 4, a flow diagram is shown of a process 400 for synchronizing beats in a game, according to an exemplary embodiment. Process 400 may be implemented by one or more processing circuits configured to store and execute machine instructions. For example, process 400 may be implemented by a sound controller, a gaming machine, a remote server in communication with a bank of gaming machines, combinations thereof, or similar computing devices. In general, process 400 allows the playing of new songs or sound effects in a game to be synchronized with the beats of the currently playing song in the game.

Process 400 includes beginning the play of music in a game (step 402). The music may be stored in one or more audio files. In some cases, the music may correspond to a particular state of gameplay. For example, one song may be played during the base game, another song may be played during a bonus game, a further song may be played while the game is awaiting an action by the player, and so forth. The music may begin at any time, such as at the start of the game or a round of gameplay, in response to a transition between songs (e.g., the player enters a bonus round), etc. In one embodiment, a timer may also begin with the music, thereby tracking the playtime of the music.

Process 400 includes predicting beats in the music of the game (step 404). In one embodiment, the beats of the music may be predicted by comparing beat information associated with an audio file to a timer that tracks the playtime of the music. For example, a music file having 60 BPM and has been playing for 35.5 seconds may have the next predicted beat at 36.0 seconds. In another embodiment, the music may be analyzed directly, either before playing or in real-time, to determine how frequently the beats of the music occur. Based on the determined beat frequency and a timer that tracks the playtime of the music, subsequent beats may be predicted. For example, a sound file lacking associated beat information may be analyzed to determine the number of BPM or a comparable beat frequency value.

Process 400 includes identifying the occurrence of an in-game event (step 406). An in-game event may correspond to any player-initiated event, system-initiated event, or time-based event. A player-initiated event may be any in-game event that occurs in response to input from a user interface device (e.g., a touch screen display, a console button, a money acceptor, etc.). For example, a player inserting funds into a gaming machine may trigger an in-game event. A system-initiated event may be any in-game event that occurs based on a determination made by the game itself. For example, a system-initiated event may occur based on the outcome of a random number generator used by the game (e.g., to determine which cards are dealt to the player in a blackjack game, to determine which symbols appear across a payline in a slot-based game, etc.). In some cases, a time-based event may also occur within the game, such as player timeouts, events that occur relative to when the player first started playing, or the like. For example, if the player of the game has not interacted with the game in a predefined amount of time, this may trigger an in-game event such as switching the game to a waiting mode.

Process 400 includes identifying an audio file associated with the in-game event (step 408). In some cases, an in-game event may be associated with a particular song, sound effect, or other audio. For example, an in-game event corresponding to entry of a bonus round may have an associated song or sound effect for the bonus round. In another example, an in-game event indicative of a payout in a wager-based game may have an associated sound effect. In general, a sound effect may be played in conjunction with the currently playing music of the game (e.g., on top of the currently playing song). A new song, however, may replace the currently playing song, in some cases. For example, when the game changes states as part of an in-game event (e.g., enters a bonus round, etc.), the in-game event may trigger replacement of the currently playing song with another song.

Process 400 includes synchronizing the playing of the audio file associated with the in-game event with the predicted beats of the currently playing music (step 410). In various embodiments, the playing of the audio file associated with the in-game event may be delayed until the next predicted beat of the currently playing song. For example, if the in-game event occurs at 30.4 seconds into the song and the next beat is predicted to occur at 35 seconds into the song, the playing of the audio file associated with the in-game event may be delayed for 4.6 seconds. In further cases, the playing of the audio file may be delayed for any subsequent beat of the currently playing song. For example, if the song is predicted to have beats 35, 40, and 45 seconds into the song, the audio file associated with the in-game event may be played starting at any of these times.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular embodiments. Certain features that are described in this specification in the context of separate implementations or embodiments can also be implemented in combination in a single implementation. Conversely, various features that are described in the context of a single implementation or embodiment can also be implemented in multiple implementations or embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of operating a gaming system, said method comprising:
   (a) if a physical item associated with a monetary value is received by an acceptor, identifying, by a validator, the received physical item and establishing, by a processing circuit, a credit balance based at least in part on the monetary value associated with the received and identified physical item;

(b) if a wager button is actuated, placing, by the processing circuit, a wager on a play of a game;

(c) initiating, by the processing circuit, playing of a first audio file associated with the game and starting, by the processing circuit, a timer upon said initiation;

(d) playing, by at least one output device, the first audio file;

(e) comparing, by the processing circuit, beat data associated with the playing first audio file to the timer to predict when beats of the playing first audio file will occur;

(f) upon an occurrence of an in-game event during said play of the game after initiation of the playing of the first audio file, identifying, by the processing circuit, a second audio file associated with the in-game event; initiating, by the processing circuit, playing of the second audio file at a point in time based at least in part on the predicted beats of the playing first audio file; and playing, by the at least one output device, the second audio file; and (g) if a cashout button is actuated, initiating, by the processing circuit, a payout associated with the credit balance.

2. The method of claim 1, wherein the beat data comprises a beat frequency value.

3. The method of claim 1, further comprising:
identifying, by the processing circuit, the occurrence of beats in the playing first audio file; and
predicting, by the processing circuit, when the beats of the playing first audio file will occur based on the identified beats.

4. The method of claim 1, further comprising:
delaying, by the processing circuit, initiating the playing of the second audio file associated with the in-game event until a time when a beat of the playing first audio file is predicted to occur.

5. The method of claim 1, further comprising:
stopping, by the processing circuit, the playing first audio file when the second audio file associated with the in-game event is played.

6. A non-transitory computer-readable storage medium having instructions stored therein that, when executed by one or more processors, cause the one or more processors to:

(a) following receipt, by an acceptor, of a physical item associated with a monetary value and identification, by a validator, of the received physical item, establish a credit balance based at least in part on the monetary value associated with the received and identified physical item;

(b) if a wager button is actuated, place a wager on a play of a game;

(c) initiate playing of a first audio file associated with the game and start a timer upon said initiation;

(d) cause at least one output device to play the first audio file;

(e) compare beat data associated with the playing first audio file to the timer to predict when beats of the playing first audio file will occur;

(f) upon an occurrence of an in-game event during said play of the game after initiation of the playing of the first audio file, identify a second audio file associated with the in-game event; initiate playing of the second audio file based at least in part on the predicted beats of the playing first audio file; and cause the at least one output device to play the second audio file; and (g) if a cashout button is actuated, cause an initiation of a payout associated with the credit balance.

7. The non-transitory computer-readable storage medium of claim 6, wherein the beat data comprises a beat frequency value.

8. The non-transitory computer-readable storage medium of claim 6, wherein the instructions, when executed by the one or more processors, cause the one or more processors to:
identify the occurrence of beats in the playing first audio file; and
predict when the beats of the playing first audio file will occur based on the identified beats.

9. The non-transitory computer-readable storage medium of claim 6, wherein the instructions, when executed by the one or more processors, cause the one or more processors to:
delay initiating the playing of the second audio file associated with the in-game event until a time when a beat of the playing audio file is predicted to occur.

10. The non-transitory computer-readable storage medium of claim 6, wherein the instructions, when executed by the one or more processors, cause the one or more processors to stop the playing first audio file when the second audio file associated with the in-game event is played.

11. An electronic gaming machine comprising:
a housing;
one or more electronic displays supported by the housing;
one or more speakers supported by the housing;
a plurality of input devices supported by the housing, the plurality of input devices including a validator and an acceptor; and
a processing circuit configured to operate with the one or more electronic displays, the one or more speakers, and the plurality of input devices to:

(a) if a physical item associated with a monetary value is received by the acceptor, identify, by the validator, the received physical item and establish a credit balance based at least in part on the monetary value associated with the received and identified physical item;

(b) if a wager button is actuated, place a wager on a play of a game;

(c) initiate playing of a first audio file associated with the game and start a timer upon said initiation;

(d) play the first audio file via the one or more speakers;

(e) compare beat data associated with the playing first audio file to the timer to predict when beats of the playing first audio file will occur;

(f) upon an occurrence of an in-game event during said play of the game after initiation of the playing of the first audio file, identify a second audio file associated with the in-game event, initiate playing of the second audio file based at least in part on the predicted beats of the playing first audio file, and play the second audio file; and (g) if a cashout button is actuated, initiate a payout associated with the credit balance.

12. The electronic gaming machine of claim 11, wherein the beat data comprises a beat frequency value.

13. The electronic gaming machine of claim 11, wherein the processing circuit is configured to:
identify the occurrence of beats in the playing first audio file; and
predict when the beats of the playing first audio file will occur based on the identified beats.

14. The electronic gaming machine of claim 11, wherein the processing circuit is configured to:

delay the playing of the second audio file associated with the in-game event until a time when a beat of the playing first audio file is predicted to occur.

15. The electronic gaming machine of claim 11, wherein the processing circuit is configured to:
stop the playing first audio file when the second audio file associated with the in-game event is played.

\* \* \* \* \*